(12) United States Patent
Noguchi et al.

(10) Patent No.: US 6,660,187 B2
(45) Date of Patent: Dec. 9, 2003

(54) PHOSPHOR FOR USE WITH LOW SPEED ELECTRON BEAMS

(75) Inventors: Yasunobu Noguchi, Anan (JP); Kiyoshi Tamura, Mobara (JP)

(73) Assignees: Nichia Corporation, Tokushima (JP); Futaba Corporation, Chiba (JP)

(*) Notice: Subject to any disclaimer, the term of this patent is extended or adjusted under 35 U.S.C. 154(b) by 6 days.

(21) Appl. No.: 10/162,572

(22) Filed: Jun. 6, 2002

(65) Prior Publication Data

US 2003/0006400 A1 Jan. 9, 2003

(30) Foreign Application Priority Data

Jun. 7, 2001 (JP) .......................... 2001-173149
May 27, 2002 (JP) .......................... 2002-153102

(51) Int. Cl.$^7$ ............................. C09K 11/79
(52) U.S. Cl. ............................. 252/301.4 F
(58) Field of Search ................. 252/301.4 F

(56) References Cited

U.S. PATENT DOCUMENTS 4,894,583 A * 1/1990 Berkstresser et al. ........ 313/468
6,517,740 B2 * 2/2003 Kataoka et al. ....... 252/301.4 F

* cited by examiner

*Primary Examiner*—C. Melissa Koslow
(74) *Attorney, Agent, or Firm*—Wenderoth, Lind & Ponack, L.L.P.

(57) ABSTRACT

A phosphor for use with low speed electron beams is characterized by the following general composition formula.

$(Y, Ce)_2O_3 \cdot nSiO_2$ $0.4 \leq n < 1.0$

16 Claims, 7 Drawing Sheets

PHOSPHOR FOR USE WITH LOW SPEED ELECTRON BEAMS

This application is based on Applications No. 173149 filed in Japan on Jun. 7, 2001, and No. 153102 filed in Japan on May 27, 2002, the content of which is incorporated hereunto by reference.

BACKGROUND OF THE INVENTION

This invention relates to a low speed electron beam phosphor primarily for use in field emission displays (referred to as FEDs in this patent application).

A FED is a flat panel display which excites phosphor material with low speed electron beams, and is configured with an anode and corresponding cathode. A phosphor film established at the anode-side is excited by electrons emitted from the cathode to cause light emission. The electron beam for excitation at the anode is accelerated by voltages on the order of 0.1 KV to 10 KV. This is a low accelerating voltage in comparison to the several tens of KV typical for cathode ray tubes (CRTs). Therefore, special purpose phosphor material, which is excited by low speed electron beams, is used in FED applications.

Since the accelerating voltage of the electron beam for phosphor excitation in a FED is low compared to a television CRT, electron beam energy for phosphor excitation is low. Low excitation energy electrons cannot cause a phosphor to emit high luminance light. Therefore, compared to a CRT, a FED produces bright light emission by increasing the current density of the phosphor exciting electron beam. If a CRT phosphor is used at high current densities, its lifetime is significantly reduced. Consequently, although various colors of phosphors for use with televisions have been tried, almost none have been usable for FED applications.

$(Y, Ce)_2O_3 \cdot SiO_2$ phosphor has been developed as a phosphor for FED applications allowing high current densities. This phosphor emits blue light. The raw material for a phosphor of this composition is formed by incorporating $SiO_2$ particulates in a mixture of yttrium oxide ($Y_2O_3$) and cerium dioxide ($CeO_2$). Phosphor is produced by firing the raw material in a crucible. Phosphor raw material is mixed and fired to result in $(Y, Ce)_2O_3$ and $SiO_2$ with a mole ratio of 1, namely with a stoichiometric mixture.

$(Y, Ce)_2O_3 \cdot SiO_2$ phosphor fired in this fashion cannot be formed with a uniform distribution of constituents at the surface and internally. The fired phosphor has excessive $SiO_2$ near the surface of phosphor particles. This is because yttrium oxide ($Y_2O_3$) and cerium dioxide ($CeO_2$) form the core of a phosphor particle and $SiO_2$ gradually permeates inward from the surface with firing. Excess surface $SiO_2$ is the cause of electron beam induced luminance degradation for $(Y, Ce)_2O_3 \cdot SiO_2$ phosphor fired in this fashion. A phosphor with high luminance degradation characteristics does not only mean lifetime is shortened when the phosphor is used alone. When used together with other phosphors, it can cause changes in emission colors, For example, (Y, Ce)$_2$O$_3$·SiO$_2$ blue phosphor is used together with (Y, Tb)$_2$SiO$_5$ green phosphor and $(Y, Eu)_2O_3$ red phosphor as a white phosphor material. However, luminance and lifetime characteristics of $(Y, Ce)_2O_3 \cdot SiO_2$ blue phosphor are not the same as those of red and green phosphors such as these. As a result, a monochromatic phosphor formed by mixing these kinds of phosphors has the drawback that emission color changes over use.

The present invention was developed to resolve these drawbacks. It is thus a primary object of the present invention to provide a $(Y, Ce)_2O_3 \cdot SiO_2$ phosphor for use with low speed electron beams which has superior lifetime and luminance characteristics.

The above and further objects and features of the invention will more fully be apparent from the following detailed description with accompanying drawings.

SUMMARY OF THE INVENTION

The phosphor for use with low speed electron beams of this invention is represented by the following general composition formula.

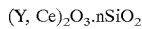

$(Y, Ce)_2O_3 \cdot nSiO_2$

Here, the value of n is in the range $0.4 \leq n < 1.0$. The value of n in this formula determines the lifetime characteristics of the $(Y, Ce)_2O_3 \cdot SiO_2$ phosphor. A phosphor with a small value of n has improved lifetime characteristics, and a phosphor with large n has worse lifetime characteristics. To improve lifetime characteristics, the value of n should be made small. However, the value of n also affects emission luminance, and values below 0.4 decreases luminance. Consequently, the above mentioned range of n is established considering luminance and lifetime characteristics, and more preferably the range of n is $0.5 \leq n \leq 0.9$.

Further, the phosphor for use with low speed electron beams of this invention can also be represented by the following general composition formula, and the range of values for a and n are given by the expressions below.

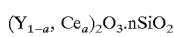

$(Y_{1-a}, Ce_a)_2O_3 \cdot nSiO_2$ $0.001 \leq a \leq 0.05$ $0.4 \leq n < 1.0$

The value of a in the formula affects the phosphor's emission luminance and color. If a is either too large or too small, the phosphor's emission luminance drops off. This is because luminance improvement due to Ce inclusion is ineffective below 0.001, and because optical quenching due to high concentrations occurs above 0.05. The value of a in the composition formula is set considering phosphor luminance and color, preferably in the above mentioned range. A still more preferable range is $0.005 \leq a \leq 0.04$.

The $(Y, Ce)_2O_3 \cdot SiO_2$ phosphor for use with low speed electron beams described above is characterized by significant Improvement in lifetime characteristics compared to related art phosphors. This is because excessive $SiO_2$ at the phosphor surface, which causes luminance degradation, is reduced by making the $SiO_2$ to $(Y, Ce)_2O_3$ ratio less than 1. The exceptional lifetime characteristics of the $(Y, Ce)_2O_3 \cdot SiO_2$ phosphor described above are shown in Table 1. For example, luminance after 1000 hrs was 45% to 70% of initial luminance for embodiment phosphors. This is radical improvement compared to 30% to 35% for prior art phosphors. In addition, superior emission luminance over prior art phosphors is also shown in Table 1. When luminance of the phosphor of comparison example 1 is taken to be 100%, luminance of embodiments 1 through 35 are considerably improved at 100% to 145%.

DETAILED DESCRIPTION OF THE INVENTION

Embodiments

Figure 1:
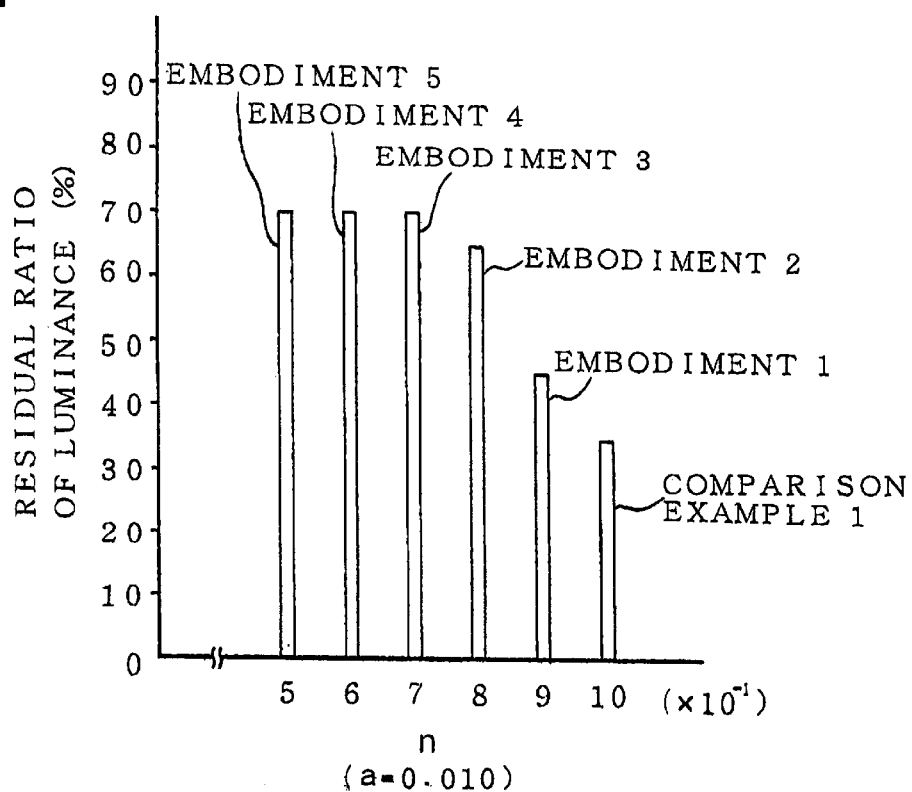
FIG. 1 is a graph showing residual ratio of luminance while varying n in the general composition formula, and where the value of a is 0.010. Here, residual ratio of luminance for the phosphors of embodiments 1 through 5 are shown.
Figure 2:
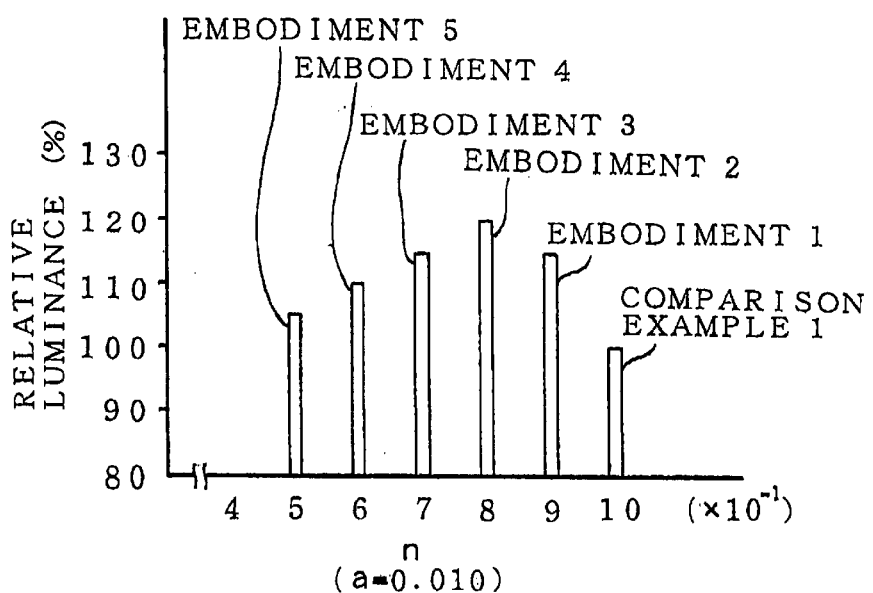
FIG. 2 is a graph showing relative luminance compared to the phosphor of comparison example 1 while varying n in the general composition formula, and where the value of a is 0.010. Here, relative luminance for the phosphors of embodiments 1 through 5 are shown.
Figure 3:
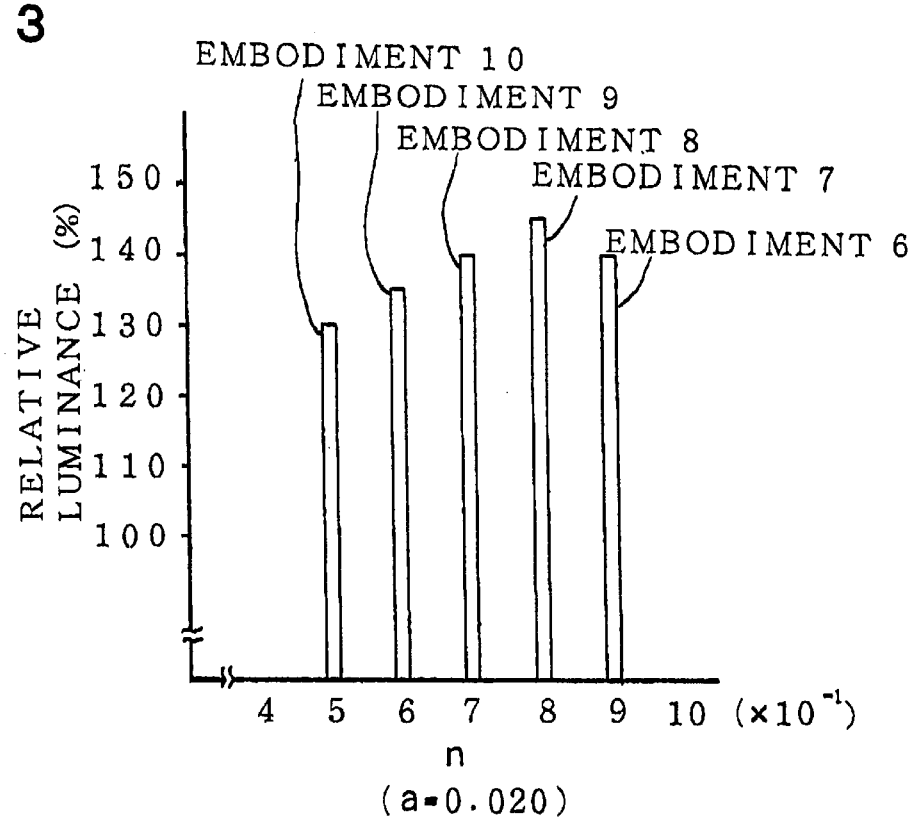
FIG. 3 is a graph showing relative luminance compared to the phosphor of comparison example 1 while varying n in the general composition formula, and where the value of a is 0.020. Here, relative luminance for the phosphors of embodiments 6 through 10 are shown.
Figure 4:
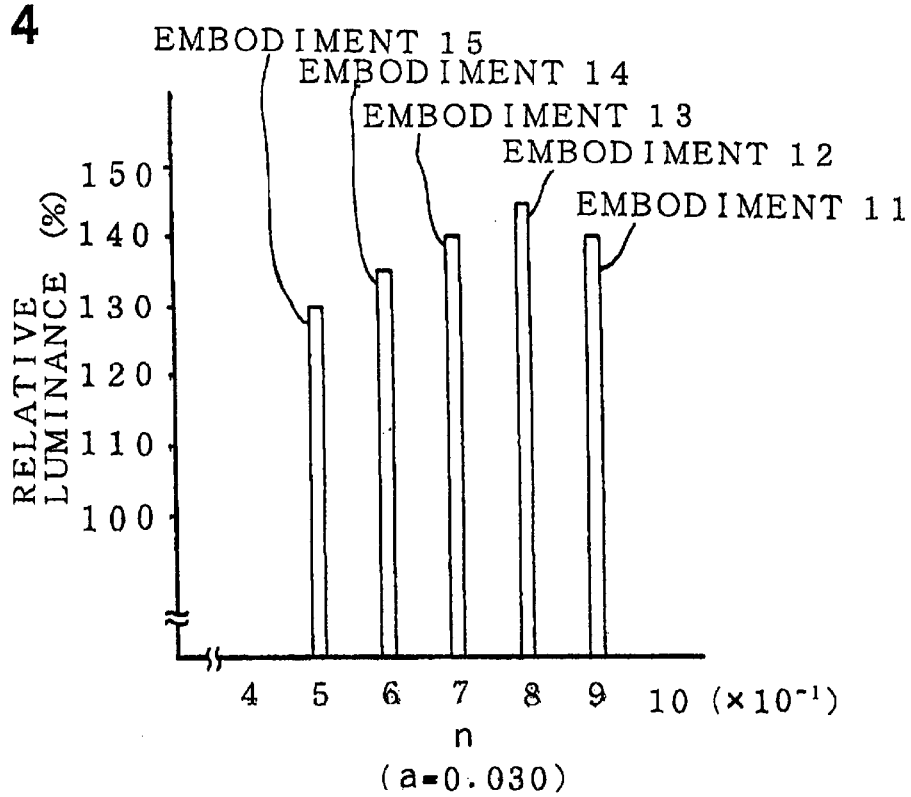
FIG. 4 is a graph showing relative luminance compared to the phosphor of comparison example 1 while varying n in the general composition formula, and where the value of a is 0.030. Here, relative luminance for the phosphors of embodiments 11 through 15 are shown.
Figure 5:
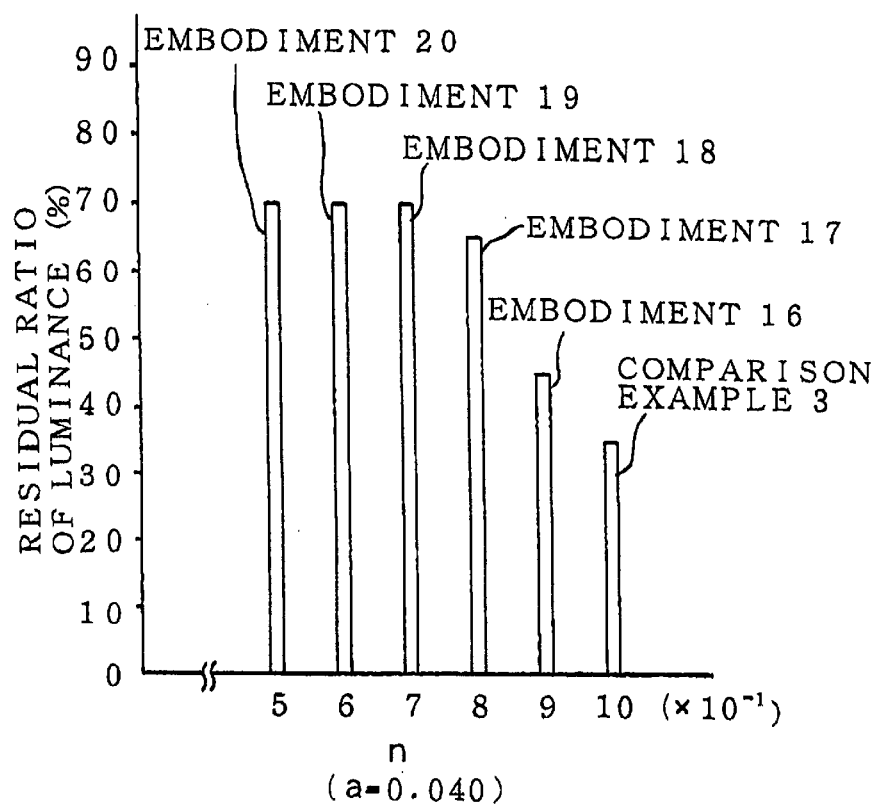
FIG. 5 is a graph showing residual ratio of luminance while varying n in the general composition formula, and where the value of a is 0.040. Here, residual ratio of luminance for the phosphors of embodiments 16 through 20 are shown.
Figure 6:
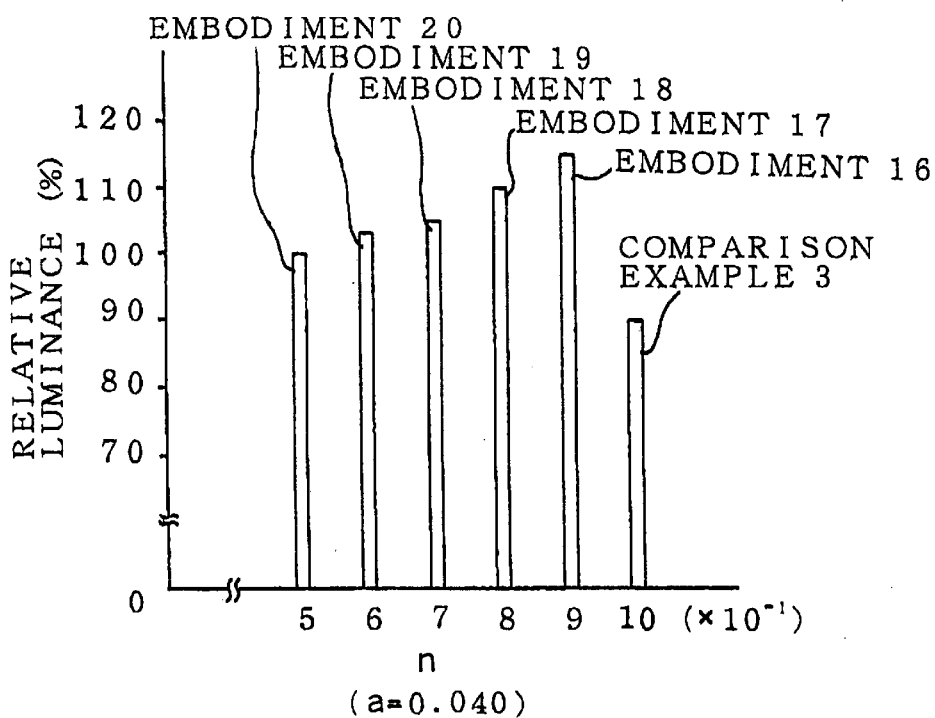
FIG. 6 is a graph showing relative luminance compared to the phosphor of comparison example 1 while varying n in the general composition formula, and where the value of a is 0.040. Here, relative luminance for the phosphors of embodiments 16 through 20 are shown.
Figure 7:
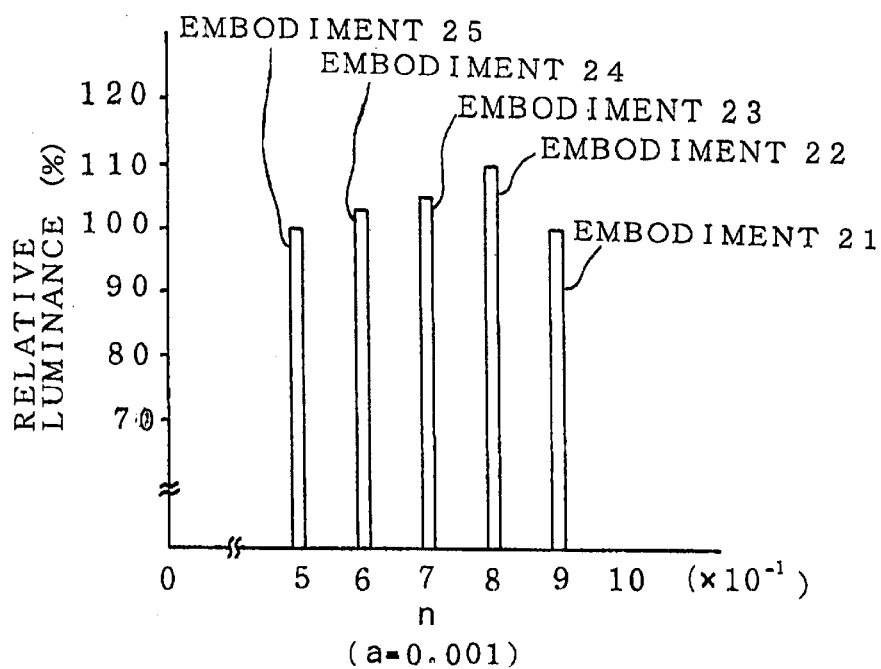
FIG. 7 is a graph showing relative luminance compared to the phosphor of comparison example 1 while varying n in the general composition formula, and where the value of a is 0.001. Here, relative luminance for the phosphors of embodiments 21 through 25 are shown.
Figure 8:
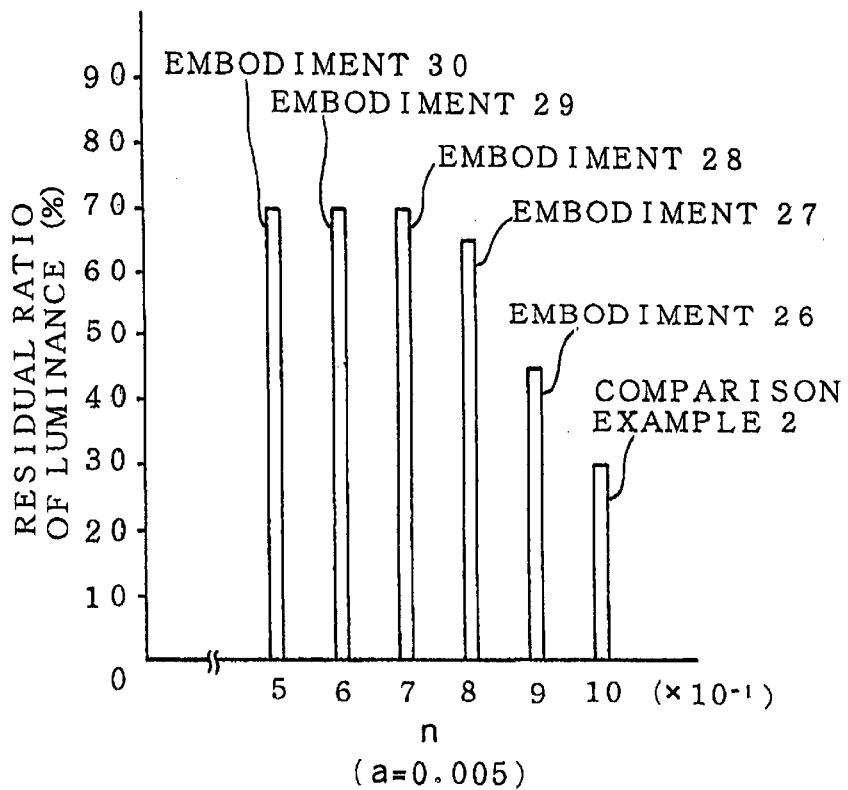
FIG. 8 is a graph showing residual ratio of luminance while varying n in the general composition formula, and where the value of a is 0.005. Here, residual ratio of luminance for the phosphors of embodiments 26 through 30 are shown.
Figure 9:
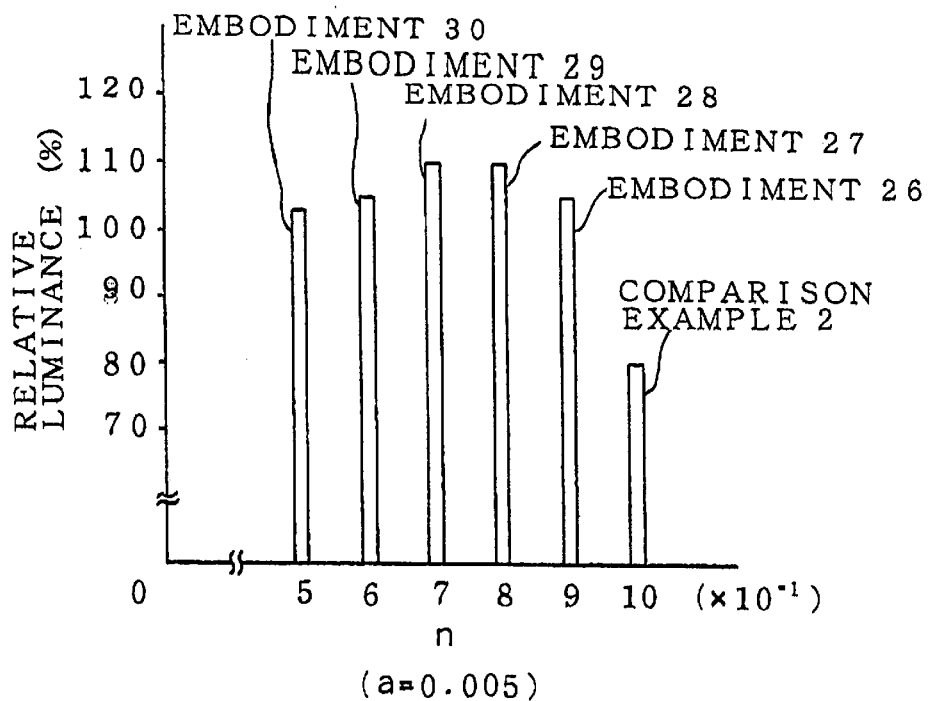
FIG. 9 is a graph showing relative luminance compared to the phosphor of comparison example 1 while varying n in the general composition formula, and where the value of a is 0.005. Here, relative luminance for the phosphors of embodiments 26 through 30 are shown.
Figure 10:
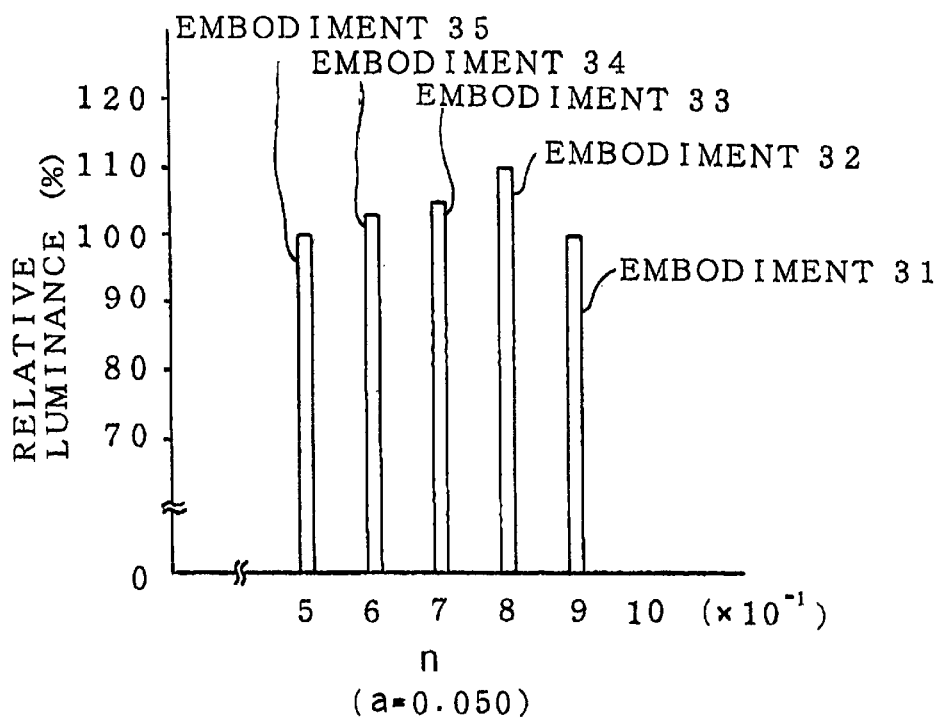
FIG. 10 is a graph showing relative luminance compared to the phosphor of comparison example 1 while varying n in the general composition formula, and where the value of a is 0.050. Here, relative luminance for the phosphors of embodiments 31 through 35 are shown.
Figure 11:
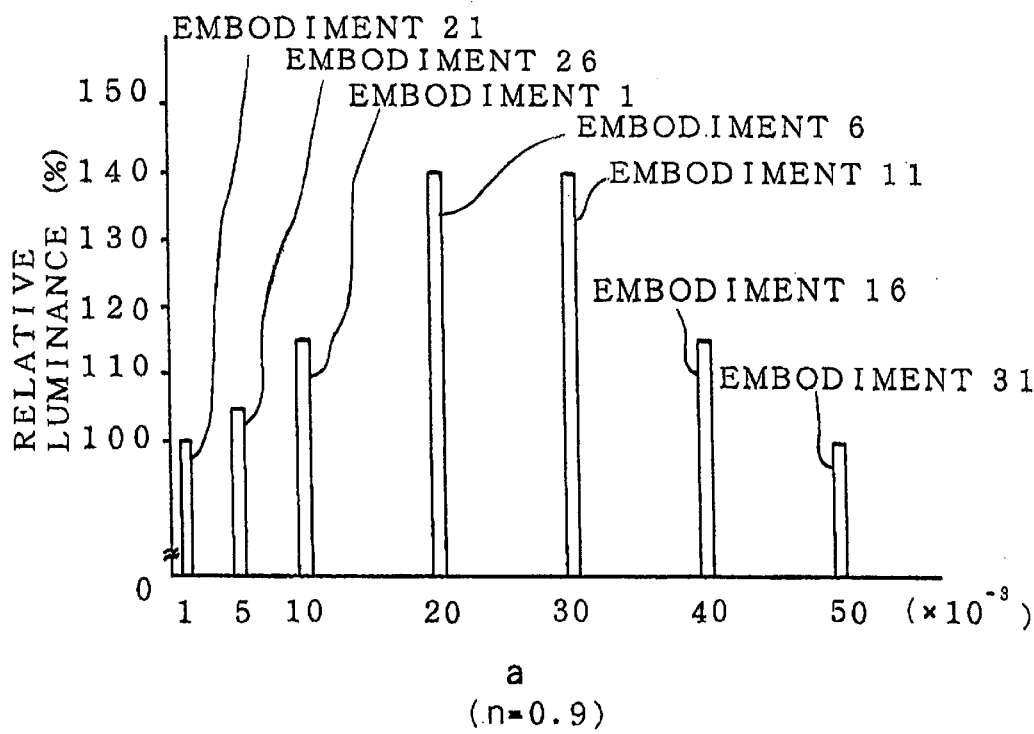
FIG. 11 is a graph showing relative luminance compared to the phosphor of comparison example 1 while varying a in the general composition formula, and where the value of n is 0.9. Here, relative luminance for the phosphors of embodiments 1, 6, 11, 16, 21, 26, and 31 are shown.
Figure 12:
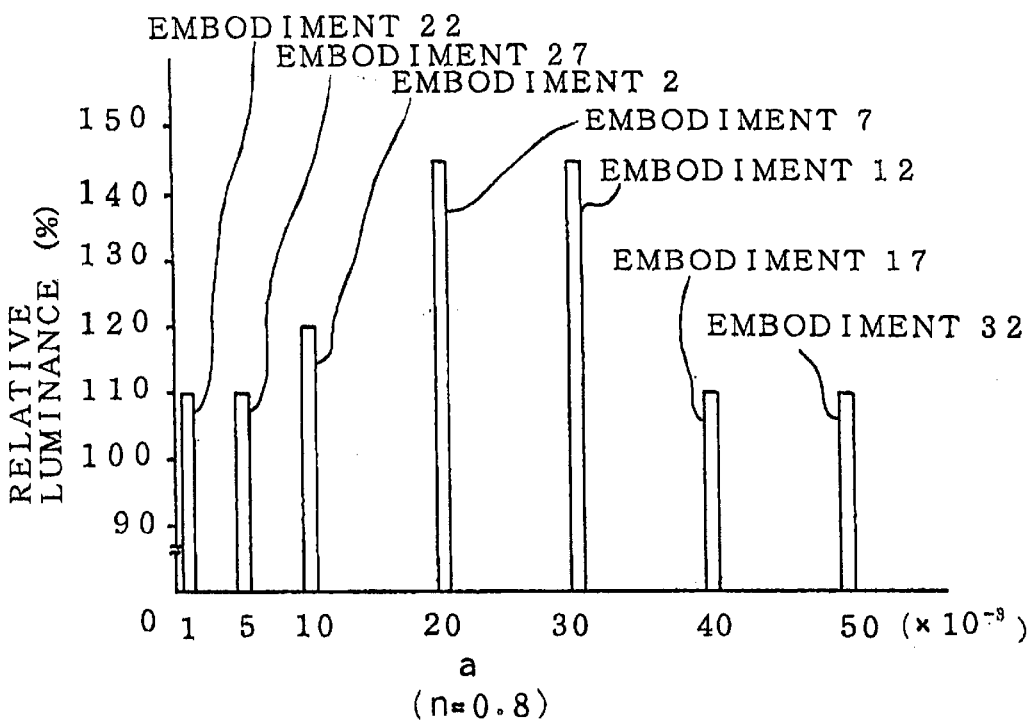
FIG. 12 is a graph showing relative luminance compared to the phosphor of comparison example 1 while varying a in the general composition formula, and where the value of n is 0.8. Here, relative luminance for the phosphors of embodiments 2, 7, 12, 17, 22, 27 and 32 are shown.
Figure 13:
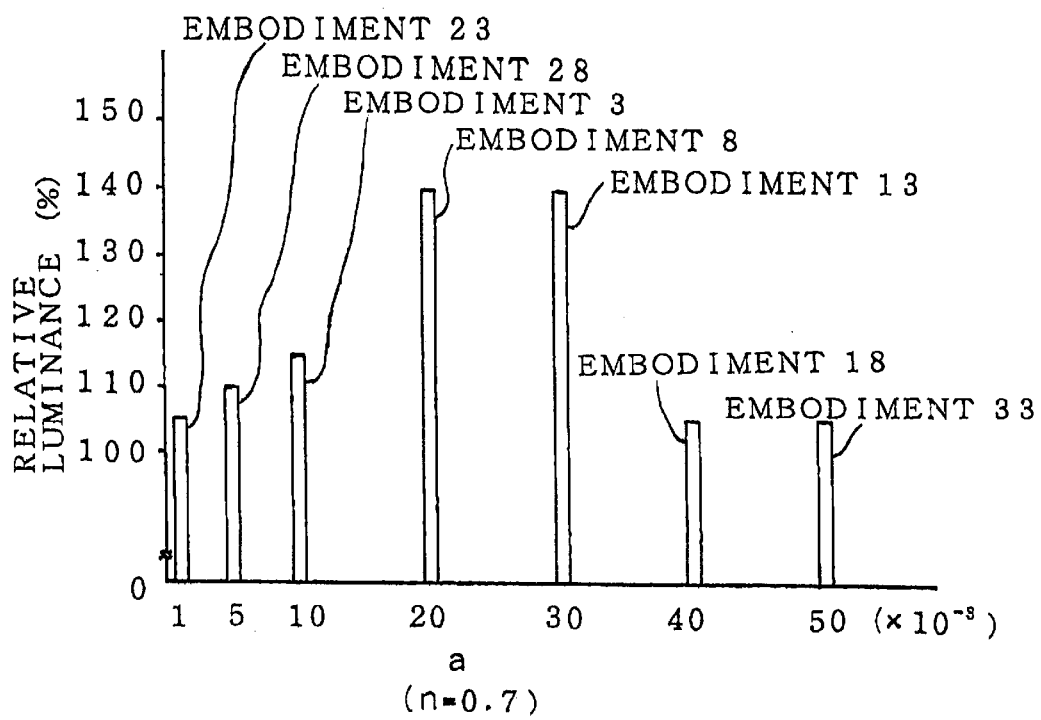
FIG. 13 is a graph showing relative luminance compared to the phosphor of comparison example 1 while varying a in the general composition formula, and where the value of n is 0.7. Here, relative luminance for the phosphors of embodiments 3, 8, 13, 18, 23, 28 and 33 are shown.
Figure 14:
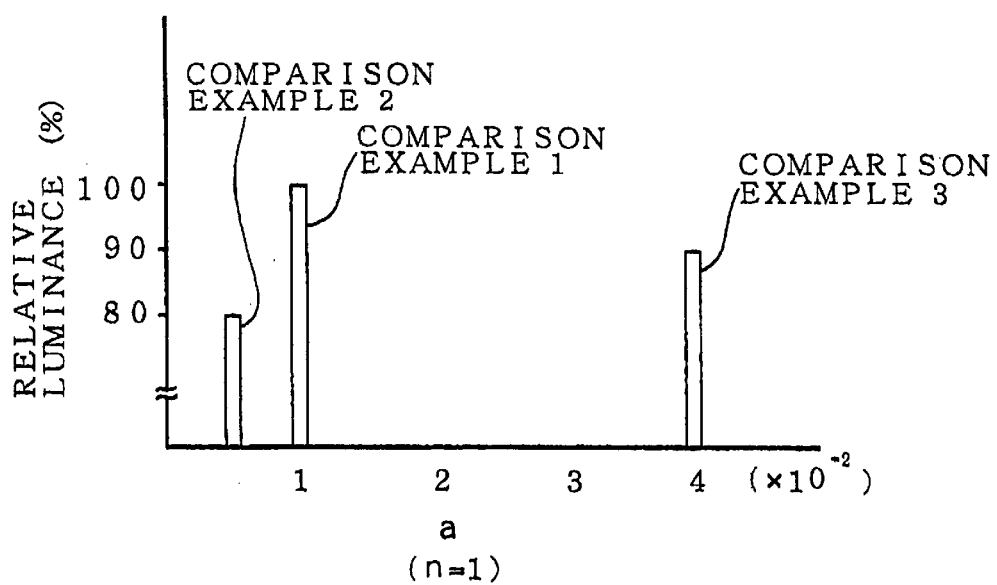
FIG. 14 is a graph showing relative luminance compared to the phosphor of comparison example 1 while varying a in the general composition formula, and where the value of n is 1. Here, relative luminance for the phosphors of embodiments 1 through 3 are shown.

[Embodiment 1]
(1) The following raw materials are prepared.
  co-precipitate oxides formed by the method below 100 g
  micro-silica ($SiO_2$) 23.9 g
  Co-precipitate oxides, $(Y_{0.99}, Ce_{0.01})_2O_3$, are produced by the following process steps.
   1) 111.8 g of $Y_2O_3$ and 1.7 g of $CeO_2$ are dissolved in an aqueous solution of $HNO_3$,
   2) An aqueous solution of 500 g of oxalic acid is added to the solution from 1) while stirring. The precipitate formed is separated by Nutsche funnel and washed in water.
   3) Oxalate formed from 2) is put in a quartz crucible, covered, and fired for 15 hrs at 900° C. to produce the co-precipitate oxides, $(Y_{0.99}, Ce_{0.01})_2O_3$.
(2) The co-precipitate oxides, micro-silica ($SiO_2$), 200 ml of ethanol, and 200 g of aluminum balls are put together in a magnetic pot and milled for 2 hrs.
(3) Raw materials are removed from the magnetic pot, transferred to a vat, heat treated at 105° C., and dried. The mixed phosphor raw materials are obtained in this process step.
(4) The mixed raw materials are inserted in an aluminum crucible. The crucible is covered and fired for 3 hrs at 1500° C.
(5) After cooling, the fired contents of the crucible are removed, inserted into a polyvinyl jar with 400 ml of water and 200 g of beads, and the polyvinyl jar is rotated to grind the fired material, Next, the contents are removed from the polyvinyl jar and passed through a 200 mesh nylon filter to remove large phosphor particles. Finally, fluid is decanted, and after drying and further filtering, phosphor material with the following composition is obtained.

$(Y_{0.990}, Ce_{0.010})_2 \cdot 0.9SiO_5$

[Embodiments 2 through 35]
Phosphors with composition shown in Table 1 are produced in the same manner as embodiment 1 except the composition of co-precipitate oxides and the amount of added micro-silica ($SiO_2$) are changed.

COMPARISON EXAMPLE 1

A phosphor with the following composition is produced in the same manner as embodiment 1 except the amount of micro-silica ($SiO_2$) added and mixed with 100 g of co-precipitate oxides is 26.59 instead of 23.9 g.

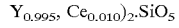
$Y_{0.995}, Ce_{0.010})_2 \cdot SiO_5$

COMPARISON EXAMPLE 2

A phosphor with the following composition is produced in the same manner as comparison example 1 except the co-precipitate oxides are $(Y_{0.995}, Ce_{0.005})_2O_3$ instead of $(Y_{0.990}, Ce_{0.010})_2O_3$.

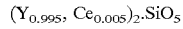
$(Y_{0.995}, Ce_{0.005})_2 \cdot SiO_5$

COMPARISON EXAMPLE 3

A phosphor with the following composition is produced in the same manner as comparison example 1 except the co-precipitate oxides are $(Y_{0.960}, Ce_{0.040})_2O_3$ instead of $(Y_{0.990}, Ce_{0.010})_2O_3$ $(Y_{0.960}, Ce_{0.040})_2.SiO_5$

TABLE 1

General formula $(Y_{1-a}, Ce_a)_2O_3.nSiO_2$

|  | a | N | Relative Luminance (%) | Residual Ratio of Luminance (%) |
|---|---|---|---|---|
| embodiment 1 | 0.010 | 0.9 | 115 | 45 |
| embodiment 2 | 0.010 | 0.8 | 120 | 65 |
| embodiment 3 | 0.010 | 0.7 | 115 | 70 |
| embodiment 4 | 0.010 | 0.6 | 110 | 70 |
| embodiment 5 | 0.010 | 0.5 | 105 | 70 |
| embodiment 6 | 0.020 | 0.9 | 140 | 45 |
| embodiment 7 | 0.020 | 0.8 | 145 | 65 |
| embodiment 8 | 0.020 | 0.7 | 140 | 70 |
| embodiment 9 | 0.020 | 0.6 | 135 | 70 |
| embodiment 10 | 0.020 | 0.5 | 130 | 70 |
| embodiment 11 | 0.030 | 0.9 | 140 | 45 |
| embodiment 12 | 0.030 | 0.8 | 145 | 65 |
| embodiment 13 | 0.030 | 0.7 | 140 | 70 |
| embodiment 14 | 0.030 | 0.6 | 135 | 70 |
| embodiment 15 | 0.030 | 0.5 | 130 | 70 |
| embodiment 16 | 0.040 | 0.9 | 115 | 45 |
| embodiment 17 | 0.040 | 0.8 | 110 | 65 |
| embodiment 18 | 0.040 | 0.7 | 105 | 70 |
| embodiment 19 | 0.040 | 0.6 | 103 | 70 |
| embodiment 20 | 0.040 | 0.5 | 100 | 70 |
| embodiment 21 | 0.001 | 0.9 | 100 | 45 |
| embodiment 22 | 0.001 | 0.8 | 110 | 65 |
| embodiment 23 | 0.001 | 0.7 | 105 | 70 |
| embodiment 24 | 0.001 | 0.6 | 103 | 70 |
| embodiment 25 | 0.001 | 0.5 | 100 | 70 |
| embodiment 26 | 0.005 | 0.9 | 105 | 45 |
| embodiment 27 | 0.005 | 0.8 | 110 | 65 |
| embodiment 28 | 0.005 | 0.7 | 110 | 70 |
| embodiment 29 | 0.005 | 0.6 | 105 | 70 |
| embodiment 30 | 0.005 | 0.5 | 103 | 70 |
| embodiment 31 | 0.050 | 0.9 | 100 | 45 |
| embodiment 32 | 0.050 | 0.8 | 110 | 65 |
| embodiment 33 | 0.050 | 0.7 | 105 | 70 |
| embodiment 34 | 0.050 | 0.6 | 103 | 70 |
| embodiment 35 | 0.050 | 0.5 | 100 | 70 |
| comparison example 1 | 0.010 | 1.0 | 100 | 35 |
| comparison example 2 | 0.005 | 1.0 | 80 | 30 |
| comparison example 3 | 0.040 | 1.0 | 90 | 35 |

Measurement conditions for Table 1 are 3 kV electron beam accelerating voltage for phosphor excitation and 1.5 mA/cm² current density, which are representative of measured values for actual FED devices.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the meets and bounds of the claims or equivalence of such meets and bounds thereof are therefore intended to be embraced by the claims.

What is claimed is:

1. A phosphor for use with low speed electron beams characterized by the following general composition formula:

$(Y, Ce)_2O_3.nSiO_2$ $0.4 \leq n < 1.0$.

2. A phosphor for use with low speed electron beams as recited in claim 1 wherein the value of n in the general composition formula is greater than or equal to 0.5.

3. A phosphor for use with low speed electron beams as recited in claim 1 wherein the value of n in the general composition formula is greater than or equal to 0.6.

4. A phosphor for use with low speed electron beams as recited in claim 1 wherein the value of n in the general composition formula is greater than or equal to 0.7.

5. A phosphor for use with low speed electron beams as recited in claim 1 wherein the value of n in the general composition formula is less than or equal to 0.9.

6. A phosphor for use with low speed electron beams as recited in claim 2 wherein the value of n in the general composition formula is less than or equal to 0.9.

7. A phosphor for use with low speed electron beams as recited in claim 3 wherein the value of n in the general composition formula is less than or equal to 0.9.

8. A phosphor for use with low speed electron beams characterized by the following general composition formula:

$(Y_{1-a}, Ce_a)_2O_3.nSiO_2$ where $0.001 \leq s \leq 0.05$ and $0.4 \leq n < 1.0$.

9. A phosphor for use with low speed electron beams as recited in claim 8 wherein the value of n in the general composition formula is greater than or equal to 0.5.

10. A phosphor for use with low speed electron beams as recited in claim 8 wherein the value of n in the general composition formula is greater than or equal to 0.6.

11. A phosphor for use with low speed electron beams as recited in claim 8 wherein the value of n in the general composition formula is greater than or equal to 0.7.

12. A phosphor for use with low speed electron beams as recited in claim 8 wherein the value of n in the general composition formula is less than or equal to 0.9.

13. A phosphor for use with low speed electron beams as recited in claim 9 wherein the value of n in the general composition formula is less than or equal to 0.9.

14. A phosphor for use with low speed electron beams as recited in claim 10 wherein the value of n in the general composition formula is less than or equal to 0.9.

15. A phosphor for use with low speed electron beams as recited in claim 8 wherein the value of a in the general composition formula is greater than or equal to 0.02.

16. A phosphor for use with low speed electron beams as recited in claim 8 wherein the value of a in the general composition formula is less than or equal to 0.03.

* * * * *